(12) United States Patent
Pan et al.

(10) Patent No.: US 9,031,101 B2
(45) Date of Patent: May 12, 2015

(54) MULTI-COLOR HARMONIC SYNTHESIZED LASER SYSTEM FOR LASER PROCESSING AND LASER PROCESSING METHOD USING MULTI-COLOR HARMONIC SYNTHESIZED LASER

(75) Inventors: Ci-Ling Pan, Hsinchu (TW);
Chan-Shan Yang, Hsinchu (TW);
Alexey Zaytsev, Hsinchu (TW);
Yu-Liang Cai, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 99 days.

(21) Appl. No.: 13/614,787

(22) Filed: Sep. 13, 2012

(65) Prior Publication Data
US 2013/0322474 A1   Dec. 5, 2013

(30) Foreign Application Priority Data

Jun. 4, 2012   (TW) .............................. 101119916 A

(51) Int. Cl.
| | |
|---|---|
| *H01S 3/10* | (2006.01) |
| *B23K 26/36* | (2014.01) |
| *H01S 3/13* | (2006.01) |
| *H01S 3/00* | (2006.01) |

(52) U.S. Cl.
CPC ............... *B23K 26/36* (2013.01); *H01S 3/1307* (2013.01); *H01S 3/0057* (2013.01); *H01S 3/0092* (2013.01)

(58) Field of Classification Search
CPC ..... H01S 3/109; H01S 3/0057; H01S 3/0092; B23K 26/36; B23K 26/40; B23K 26/4005
USPC ................................................ 372/26, 23, 25
See application file for complete search history.

(56) References Cited

U.S. PATENT DOCUMENTS

2012/0008651 A1* 1/2012 Bischoff et al. ................. 372/25

OTHER PUBLICATIONS

Hsu et al., "Generation of multi-octave spanning laser harmonics by cascaded quasi-phase matching in a monolithic ferroelectric crystal" Nov. 15, 2009, Optics Letters, V34No. 22, pp. 3496-3498.*

(Continued)

*Primary Examiner* — Julio J Maldonado
*Assistant Examiner* — Michael Carter
(74) *Attorney, Agent, or Firm* — Mintz Levin Cohn Ferris Glovsky and Popeo, P.C.; Peter F. Corless; Steven M. Jensen

(57) ABSTRACT

A multi-color harmonic synthesized laser system for laser processing and a laser processing method using multi-color harmonic synthesized laser are disclosed. The multi-color harmonic synthesized laser system includes a laser source for providing a single laser wave, a converter for converting the single laser wave into a plurality of harmonic waves with different frequencies, and a modulating unit for modulating amplitudes and relative phases of the harmonic waves to form a plurality of modulated harmonic waves, so as to synthesize the modulated harmonic waves as a single synthesized laser wave, wherein the single synthesized laser wave is focused on an object to perform a laser processing. The converter includes a plurality of non-linear crystals for converting the single laser wave into a fundamental harmonic wave and a plurality of multi-frequency harmonic waves. The harmonic waves are coherent and collinear, and the phases of the harmonic waves are related to one another.

9 Claims, 5 Drawing Sheets

(56) References Cited

OTHER PUBLICATIONS

Miyamoto et al. "Waveform-Controllable Optical Pulse Generation Using an Optical Pulse Synthesizer" Mar. 1, 2006, IEEE Phot.Tech. Lett., V18No. 5, pp. 721-723.*

Chen et al., "Attosecond pulse synthesis and arbitrary waveform generation with cascaded harmonics of an injection-seeded high-power Q-switched Nd:YAG laser", :aser Phys. Lett. vol. 9, No. 3, pp. 212-218 (Jan. 16, 2012).

* cited by examiner

US 9,031,101 B2

MULTI-COLOR HARMONIC SYNTHESIZED LASER SYSTEM FOR LASER PROCESSING AND LASER PROCESSING METHOD USING MULTI-COLOR HARMONIC SYNTHESIZED LASER

CROSS-REFERENCES TO RELATED APPLICATIONS

This application claims under 35 U.S.C. §119(a) the benefit of Taiwanese Application No. 101119916, filed Jun. 4, 2012, the entire contents of which is incorporated herein by reference.

BACKGROUND OF THE INVENTION

1. Field of the Invention

The present invention relates to laser systems and processing methods, and, more particularly, to a multi-color harmonic synthesized laser system for laser processing and a laser processing method using multi-color harmonic synthesized laser.

2. Description of Related Art

In the development of micro-nano technology and optoelectronic industry, high energy laser beams have been applied in the fabrication of micro electro mechanical systems, optoelectronic products and biomedical micro fluid chips such as high molecular weight material and silicon chip processing, electronic packages and drilling of circuit boards.

Generally, there are two high energy laser beam processing mechanisms, a photo-thermal mechanism and a photo-chemical mechanism. In the photo-thermal mechanism, high energy laser beams with high power density are used as a thermal source to be focused on an object in an extremely short time period, the energy absorbed on the surface of the object is introduced into the object via the thermal conduction, then a part of the object is melted or vaporized by sufficient heat, and the laser beams or a working station is moved for further processing. In the photo-chemical mechanism, the bonding in the material to be processed is broken by the high energy laser beams having photon energy, such that ablation is performed on the material, wherein it is easier to break the bonding in the material by the laser beams with shorter wavelength. In addition, in the laser ablation mechanism, high energy laser beams are absorbed by the material, and photons make electrons hop between energy levels and break bonding in a molecule, so as to perform precise ablation on the material.

In the high energy laser beam processing, the material is processed by the laser beams according to the energy absorption, thermal diffusion and melting point of the material. For example, ablation is performed on various materials by the laser beam with different frequencies, and the laser beams with different wave shapes may have various ablation efficiencies on the same material. Therefore, there is a need to provide a corresponding laser beam in response to various materials or requirements of processing so as to improve efficiency of laser processing.

SUMMARY OF THE INVENTION

The present invention provides a multi-color harmonic synthesized laser system for laser processing and a laser processing method using multi-color harmonic synthesized laser.

In accordance with the present invention, the multi-color harmonic synthesized laser system for laser processing includes a laser source for providing a single laser wave; a converter for converting the single laser wave into a plurality of harmonic waves with different frequencies; and a modulating unit for modulating amplitudes and relative phases of the harmonic waves to form a plurality of modulated harmonic waves, so as to synthesize the modulated harmonic waves as a single synthesized laser wave, wherein the single synthesized laser wave is focused on an object to perform a laser processing.

Further, the multi-color harmonic synthesized laser system includes an optical path for focusing the single synthesized laser wave on the object. The converter includes a plurality of non-linear crystals for converting the single laser wave into a fundamental harmonic wave and a plurality of multi-frequency harmonic waves based on the fundamental harmonic wave. In addition, the modulating unit includes an amplitude modulator and a phase modulator for modulating the amplitudes and the relative phases of the harmonic waves, respectively.

In accordance with the present invention, the laser processing method using multi-color harmonic synthesized laser includes the steps of providing a single laser wave; converting the single laser wave into a plurality of harmonic waves with difference frequencies; modulating amplitudes and relative phases of the harmonic waves to form a plurality of modulated harmonic waves, so as to synthesize the modulated harmonic waves as a single synthesized laser wave; and focusing the single synthesized laser wave on an object.

According to the present invention, the harmonic waves converted from the converter are coherent and collinear, and have relative phases.

In comparison with the prior art, the plurality of harmonic waves of the present invention are formed from a single laser wave, such that it is simple to modulate the relative phases and amplitudes of the harmonic waves in the present invention. Hence, the synthesized laser beam may be provided according to materials or requirements in the present invention.

DETAILED DESCRIPTION OF THE PREFERRED EMBODIMENTS

The detailed description of the present invention is illustrated by the following specific examples. Persons skilled in the art can conceive the other advantages and effects of the present invention based on the disclosure contained in the specification of the present invention.

Figure 1A:
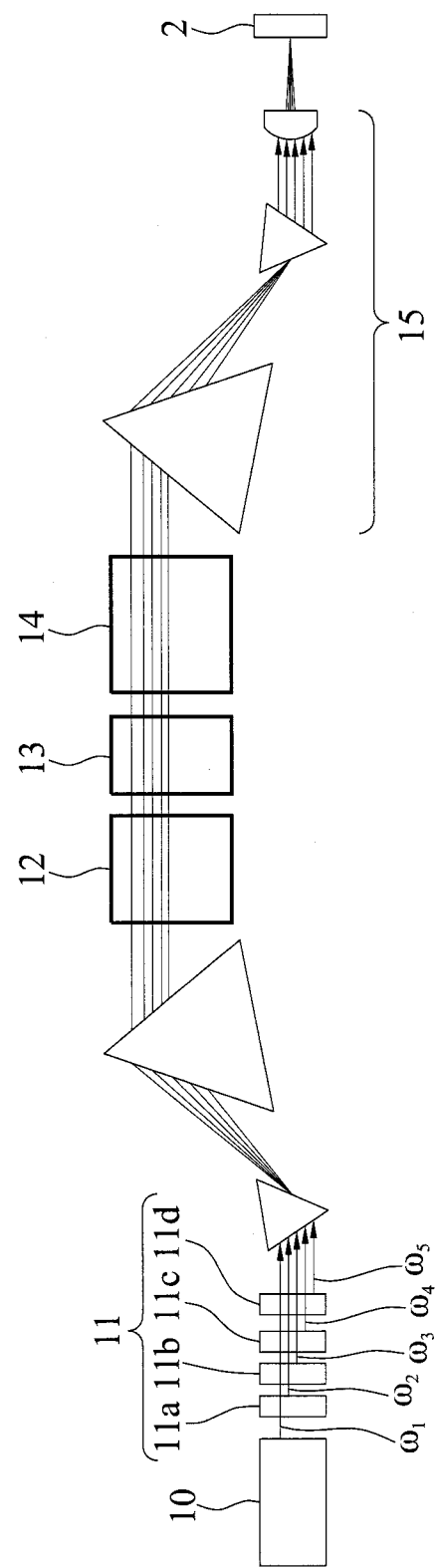
FIG. 1A is a schematic view showing a multi-color harmonic synthesized laser system for laser processing according to the present invention.

FIG. 1A is a schematic view showing a multi-color harmonic synthesized laser system for laser processing according to the present invention.

The multi-color harmonic synthesized laser system of the present invention includes a laser source 10, a converter 11, an amplitude modulator 12 and a phase modulator 13. The multi-color harmonic synthesized laser system of the present invention further includes an optical structure 14 and an optical path 15. The laser source 10 provides a single laser wave.

The converter 11 converts the single laser wave into a plurality of harmonic waves $\omega_1$, $\omega_2$, $\omega_3$, $\omega_4$ and $\omega_5$ with different frequencies (for example, the five harmonic waves in FIG. 1A). The harmonic waves $\omega_1$, $\omega_2$, $\omega_3$, $\omega_4$ and $\omega_5$ are coherent and collinear, and have related phases. Specifically, the converter 11 includes a plurality of non-linear crystals 11a, 11b, 11c and 11d, for example. The single laser wave is converted by the non-linear crystals 11a, 11b, 11c and 11d into a fundamental harmonic wave $\omega_1$ and a plurality of multi-frequency harmonic waves $\omega_2$, $\omega_3$, $\omega_4$ and $\omega_5$ based on the fundamental harmonic wave. Specifically, the power of the second harmonic wave $\omega_2$ results from the fundamental harmonic wave $\omega_1$, the power of the third harmonic wave $\omega_3$ results from the fundamental harmonic wave $\omega_1$ and the second harmonic wave $\omega_2$, the power of the fourth harmonic wave $\omega_4$ results from the fundamental harmonic wave $\omega_1$ and the third harmonic wave $\omega_1$, and the power of the fourth harmonic wave $\omega_5$ results from the fundamental harmonic wave $\omega_1$ and the fourth harmonic wave $\omega_4$. The amplitudes of the harmonic waves $\omega_1$, $\omega_2$, $\omega_3$, $\omega_4$ and $\omega_5$ are modulated by the amplitude modulator 12. The relative phases of the harmonic waves $\omega_1$, $\omega_2$, $\omega_3$, $\omega_4$ and $\omega_5$ are modulated by the phase modulator 13. According to Fourier theory, any smooth and limited periodic function may be presented as sine or cosine functions, wherein the sine or cosine is a multiple of the fundamental frequency. Thus, the relative phases and amplitudes of the harmonic waves $\omega_1$, $\omega_2$, $\omega_3$, $\omega_4$ and $\omega_5$ are modulated to form a single synthesized laser wave with various wave shapes which has various ablation efficiency while performing laser processing.

The single synthesized laser wave is focused on an object 2 via the optical structure 14 and the optical path 15, so as to perform a laser processing.

Figure 1B:
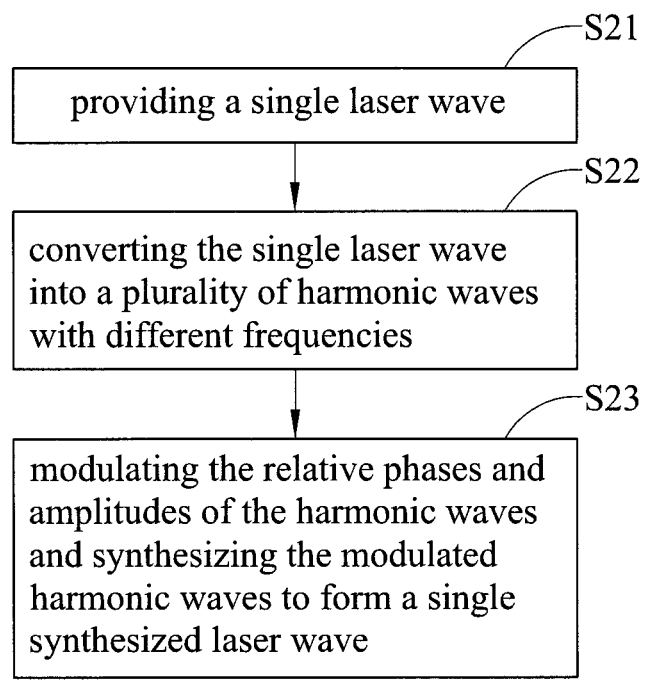
FIG. 1B is a flow chart illustrating a laser processing method using multi-color harmonic synthesized laser according to the present invention.

FIG. 1B is a flow chart showing a laser processing method using multi-color harmonic synthesized laser of the present invention. In step S21, a single laser wave is provided. In step S22, the single laser wave is converted into a plurality of harmonic waves. In step S23, the relative phases and amplitudes of the harmonic waves are modulated to form a single synthesized laser wave. The wave shape of the single synthesized laser wave may be modulated by modulating the relative phases and amplitudes of the harmonic waves.

As shown in FIG. 1A and FIG. 1B, a single laser wave provided by the laser source 10 is converted by a plurality of non-linear crystals 11a, 11b, 11c and 11d into a plurality of harmonic waves $\omega_1$, $\omega_2$, $\omega_3$, $\omega_4$ and $\omega_5$, the relative phases and amplitudes of the harmonic waves $\omega_1$, $\omega_2$, $\omega_3$, $\omega_4$ and $\omega_5$ are modulated by the amplitude modulator 12 and the phase modulator 13, and the single synthesized laser wave is focused on the object 2 via the optical structure 14 and the optical path 15.

FIGS. 2A to 2D show the peak strengths of the single synthesized laser wave with various phases according to a multi-color harmonic synthesized laser system for laser processing in the present invention.

Figure 2A:
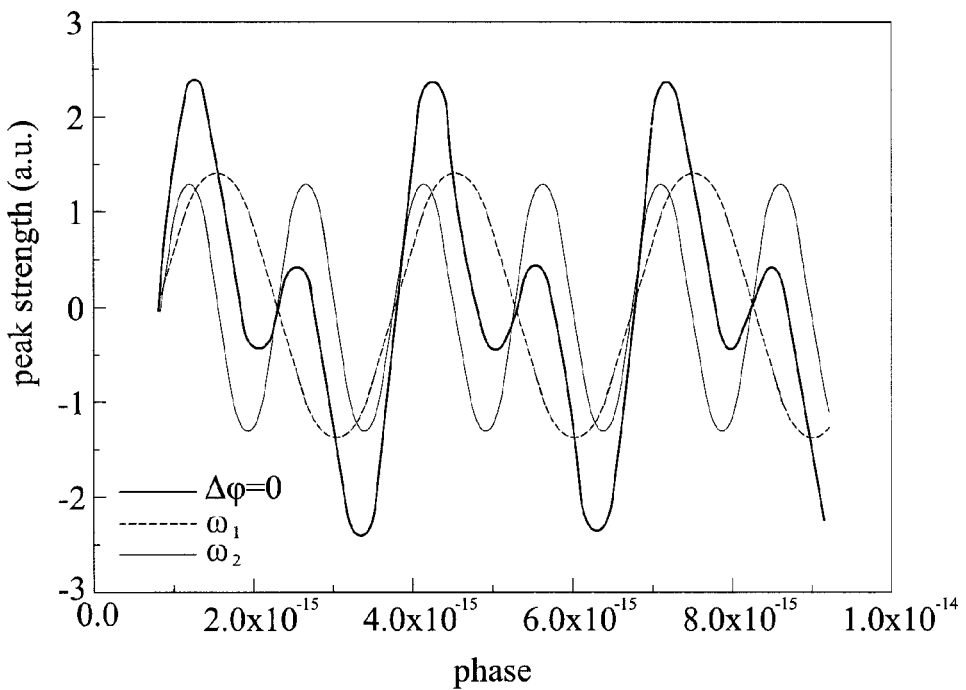
FIGS. 2A to 2D show the peak strength of the single synthesized laser wave at various phased according to an embodiment of the multi-color harmonic synthesized laser system for laser processing of the present invention.
Figure 2B:
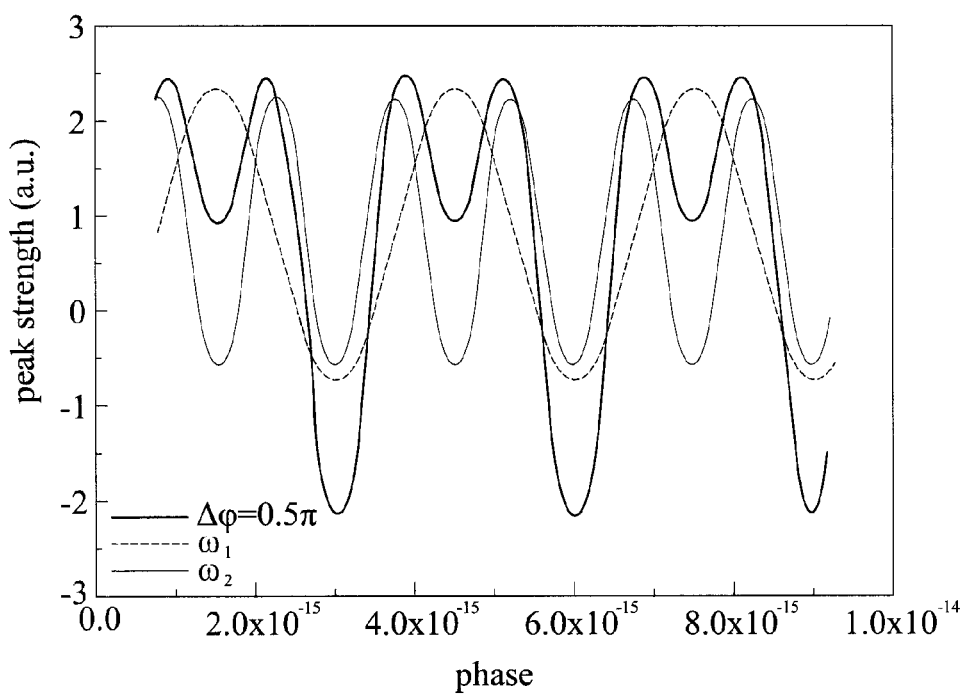
Figure 2C:
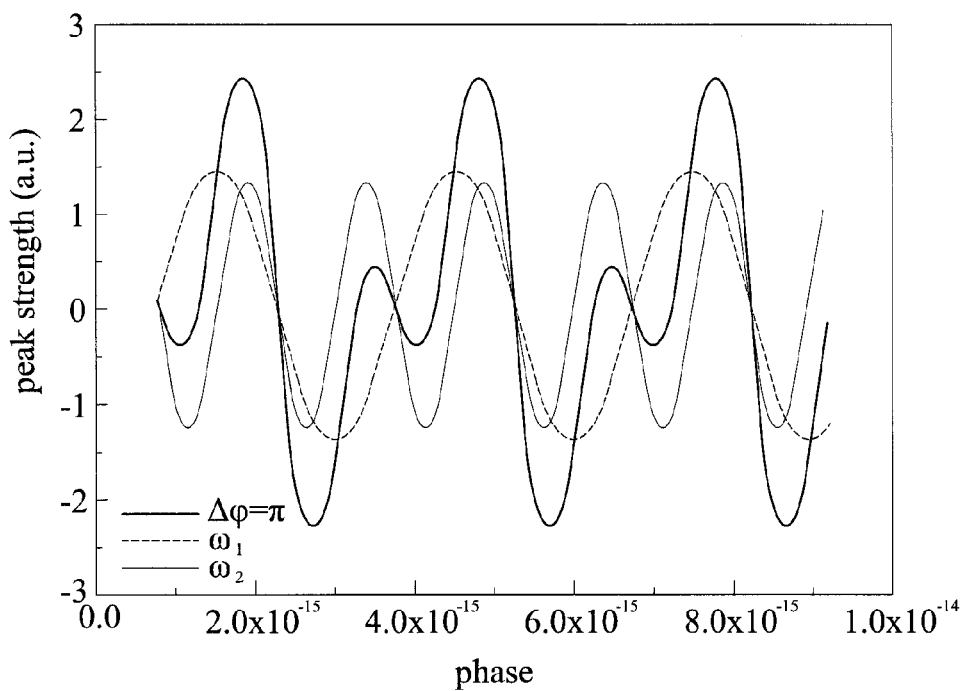
Figure 2D:
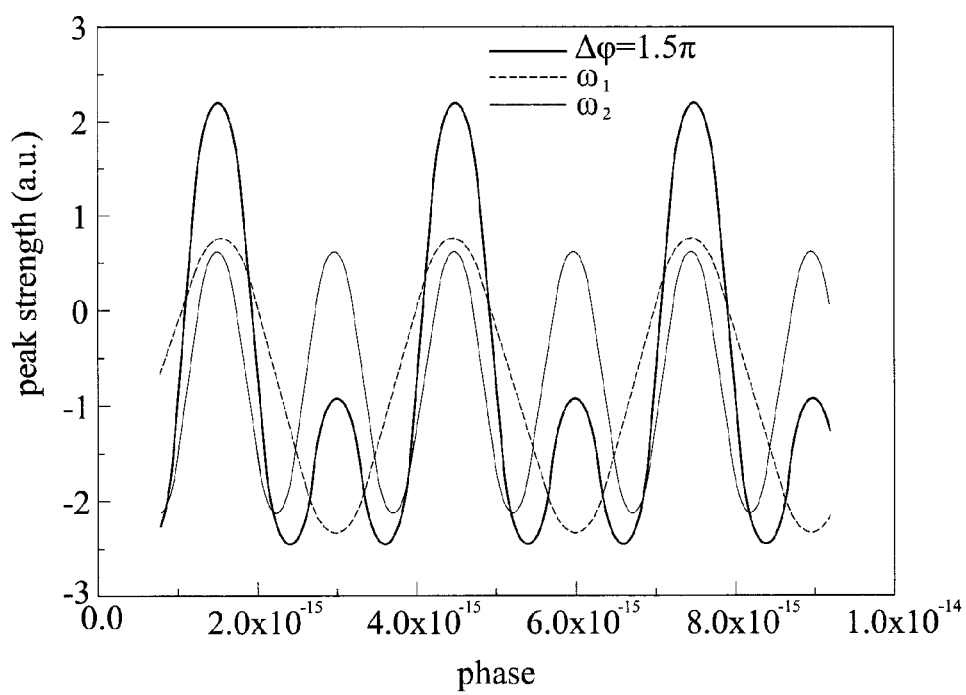

In this embodiment of the present invention, the single laser wave is converted by the converter 11 into two harmonic waves $\omega_1$ and $\omega_2$, the relative phases and amplitudes of the two harmonic waves $\omega_1$ and $\omega_2$ are modulated to form a single synthesized laser wave with various wave shapes and different power peaks. FIGS. 2A to 2D show the power peaks of the single synthesized laser wave at the relative phases ($\Delta \phi = 0$, $0.5 \pi$, $\pi$, $1.5 \pi$). As shown in FIG. 2D, the single synthesized laser wave has the higher peak strength at $\Delta \phi = 1.5 \pi$, i.e. having higher ablation efficiency while performing laser processing.

Figure 3:
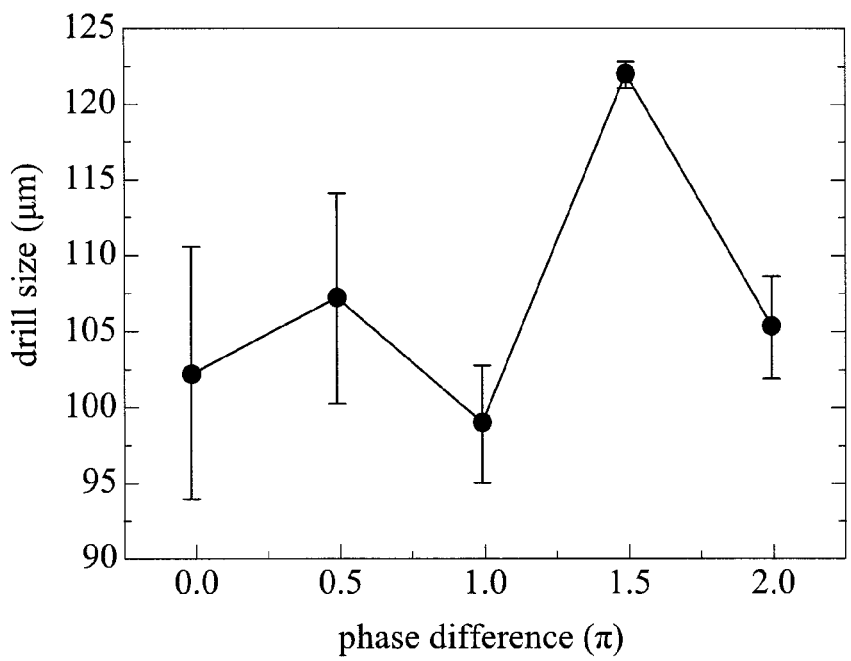
FIG. 3 shows the drill size of the single synthesized laser wave according to an embodiment of the multi-color harmonic synthesized laser system for laser processing of the present invention.
Figure 4:
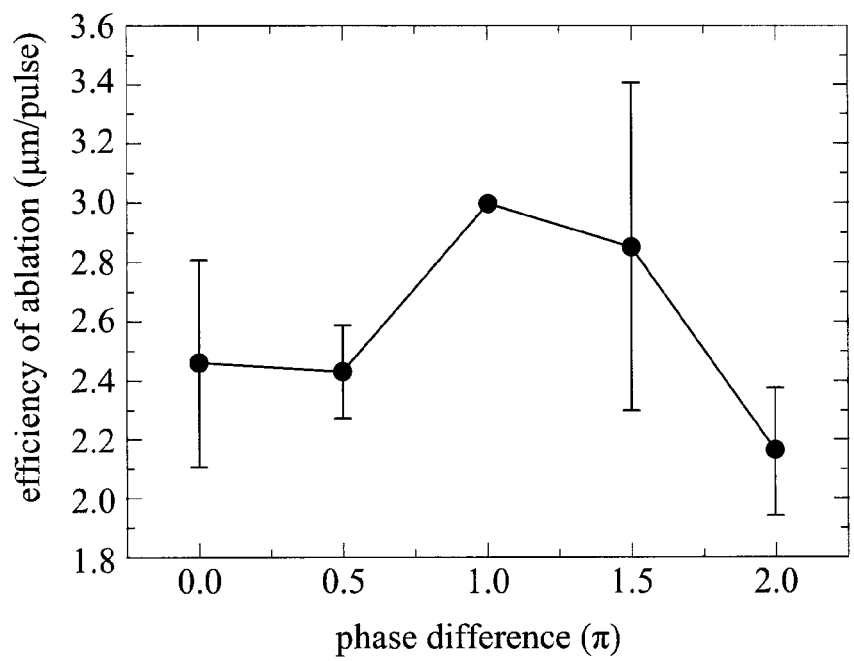
FIG. 4 shows the ablation efficiency of the single synthesized laser wave according to an embodiment of the multi-color harmonic synthesized laser system for laser processing of the present invention.

FIGS. 3 and 4 show the drill size and the ablation efficiency of the single synthesized laser wave according to an embodiment of the multi-color harmonic synthesized laser system of the present invention.

As shown in FIGS. 2A to 2D, the synthesized laser waves formed from the harmonic waves $\omega_1$ and $\omega_2$ and having different wave shapes have the higher peak strength at $\Delta \phi = 1.5 \pi$. For example, while the object is a copper sheet (150 μm), the laser ablation is performed on the object by the single synthesized laser wave formed from the harmonic waves ($\Delta \phi = 1.5 \pi$). Referring to FIG. 3, the larger drill size is formed at $\Delta \phi = 1.5 \pi$, and the ablation efficiency is higher at $\Delta \phi = 1.5 \pi$.

Accordingly, in the present invention, the amplitudes and the relative phases of the fundamental harmonic wave of the single laser wave and the multi-frequency harmonic waves based on the fundamental harmonic wave are modulated to form a single synthesized laser wave having a specific wave shape according to the materials and requirements of processing. In the present invention, the single synthesized laser wave has increased power at the peak and thus increases efficiency of laser processing.

The invention has been described using exemplary preferred embodiments. However, it is to be understood that the scope of the invention is not limited to the disclosed arrangements. The scope of the claims, therefore, should be accorded the broadest interpretation, so as to encompass all such modifications and similar arrangements.

The invention claimed is:

1. A multi-color harmonic synthesized laser system for laser processing, comprising:
    a laser source for providing a single laser wave that is configured to perform laser processing;
    a converter for converting the single laser wave into a plurality of harmonic waves with different frequencies; and
    a modulating unit for modulating amplitudes and relative phases of the harmonic waves to form a plurality of modulated harmonic waves, so as to synthesize the modulated harmonic waves using a prism as a single synthesized laser wave with various wave shapes,
    wherein the single synthesized laser wave is focused on an object to perform the laser processing,
    wherein the relative phases and the amplitudes of the harmonic waves are modulated according to materials of the object or requirements of the laser processing, and the modulated harmonic waves are synthesized into the single synthesized laser wave with various wave shapes, so as to perform the laser processing using the single synthesized laser wave with various wave shapes to obtain various ablation efficiencies.

2. The multi-color harmonic synthesized laser system of claim 1, further comprising an optical structure and an optical path for focusing the single synthesized laser wave on the object.

3. The multi-color harmonic synthesized laser system of claim 2, wherein an ablation is performed on the object by the single synthesized laser wave.

4. The multi-color harmonic synthesized laser system of claim 1, wherein the converter comprises a plurality of non-linear crystals for converting the single laser wave into a fundamental harmonic wave and a plurality of multi-frequency harmonic waves based on the fundamental harmonic wave.

5. The multi-color harmonic synthesized laser system of claim 1, wherein the modulating unit comprises an amplitude modulator and a phase modulator for modulating the amplitudes and the relative phases of the harmonic waves, respectively.

6. The multi-color harmonic synthesized laser system of claim 1, wherein the harmonic waves are coherent and collinear, and the phases of the harmonic waves are related to one another.

7. A laser processing method using multi-color harmonic synthesized laser, comprising the steps of:
 converting a single laser wave, which is configured to perform laser processing, into a plurality of harmonic waves with different frequencies;
 modulating amplitudes and relative phases of the harmonic waves to form a plurality of modulated harmonic waves, so as to synthesize the modulated harmonic waves using a prism as a single synthesized laser wave with various wave shapes; and
 focusing the single synthesized laser wave on an object,
 wherein the relative phases and the amplitudes of the harmonic waves are modulated according to materials of the object or requirements of the laser processing, and the modulated harmonic waves are synthesized into the single synthesized laser wave with various wave shapes, so as to perform the laser processing using the single synthesized laser wave with various wave shapes to obtain various ablation efficiencies.

8. The laser processing method of claim 7, wherein the step of converting further comprises converting the single laser wave into a fundamental harmonic wave and a plurality of multi-frequency harmonic waves based on the fundamental harmonic wave.

9. The laser processing method of claim 7, wherein the harmonic waves are coherent and collinear, and the phases of the harmonic waves are related to one another.

\* \* \* \* \*